US00RE42988E

(19) United States
(12) Reissued Patent
Skvorecz

(10) Patent Number: US RE42,988 E
(45) Date of Reissued Patent: Dec. 6, 2011

(54) WIRE CHAFING STAND

(76) Inventor: Robert Skvorecz, Kinnelon, NJ (US)

(21) Appl. No.: 09/772,278

(22) Filed: Mar. 15, 2001

Related U.S. Patent Documents

Reissue of:
(64) Patent No.: 5,996,948
Issued: Dec. 7, 1999
Appl. No.: 09/005,787
Filed: Jan. 12, 1998

U.S. Applications:
(63) Continuation-in-part of application No. 08/864,562, filed on May 28, 1997, now Pat. No. 5,921,513.

(51) Int. Cl.
*A47G 23/02* (2006.01)

(52) U.S. Cl. ..... 248/153; 248/175; 211/181.1; 220/743; 126/40

(58) Field of Classification Search ..... 248/146, 248/153, 154, 175, 176.2, 311.2, 312, 312.1, 248/440, 676, 152, 176.1, 218.1, 249, 309.1; 211/41.4, 41.8, 126.8, 126.9, 181.1, 119.01, 211/88.01; 220/737, 741, 43, 758, 761, 768, 220/774; 206/504, 505, 506, 509; 126/40
See application file for complete search history.

(56) References Cited

U.S. PATENT DOCUMENTS

| | | | | |
|---|---|---|---|---|
| 983,473 | A * | 2/1911 | Barnes | 220/743 |
| 1,688,846 | A * | 10/1928 | Andrews | 248/153 |
| 2,739,466 | A * | 3/1956 | Maliniak | 248/153 |
| D181,149 | S * | 10/1957 | Hoffstein et al. | D23/362 |
| 2,837,624 | A * | 6/1958 | Katzman et al. | D23/362 |
| 2,838,198 | A * | 6/1958 | Vidal | 206/509 |
| 3,276,733 | A * | 10/1966 | Rosser | 248/146 |
| 3,650,384 | A * | 3/1972 | Pegg | 248/153 |
| 4,718,402 | A * | 1/1988 | Fordyce | 248/153 |
| 5,065,735 | A * | 11/1991 | Bourgeois et al. | 126/40 |
| 5,287,800 | A * | 2/1994 | Orednick | 248/153 |
| 5,301,909 | A * | 4/1994 | Chang | 248/146 |
| 5,503,062 | A * | 4/1996 | Buff, IV | 99/426 |
| 5,921,513 | A * | 7/1999 | Skvorecz | 248/153 |
| 6,047,932 | A * | 4/2000 | Skvorecz | 248/153 |
| 6,213,005 | B1 * | 4/2001 | Sherman et al. | 99/426 |
| 6,520,354 | B1 * | 2/2003 | Skvorecz | 211/181.1 |

* cited by examiner

*Primary Examiner* — Tan Le
(74) *Attorney, Agent, or Firm* — Baker & Hostetler LLP

(57) ABSTRACT

The wire stand of the present invention includes an upper rim of wire steel in a substantially rectangular configuration, a lower rim of wire steel of similar configuration and a pair of wire legs with each formed as an integral unit with each wire leg affixed at one end thereof to the upper rim and affixed to the lower rim such that the upper rim and lower rim lie in substantial parallel alignment to one another and extending below the lower rim to maintain the lower rim a fixed distance above the support upon which the stand is placed.

7 Claims, 8 Drawing Sheets

FIG. 5
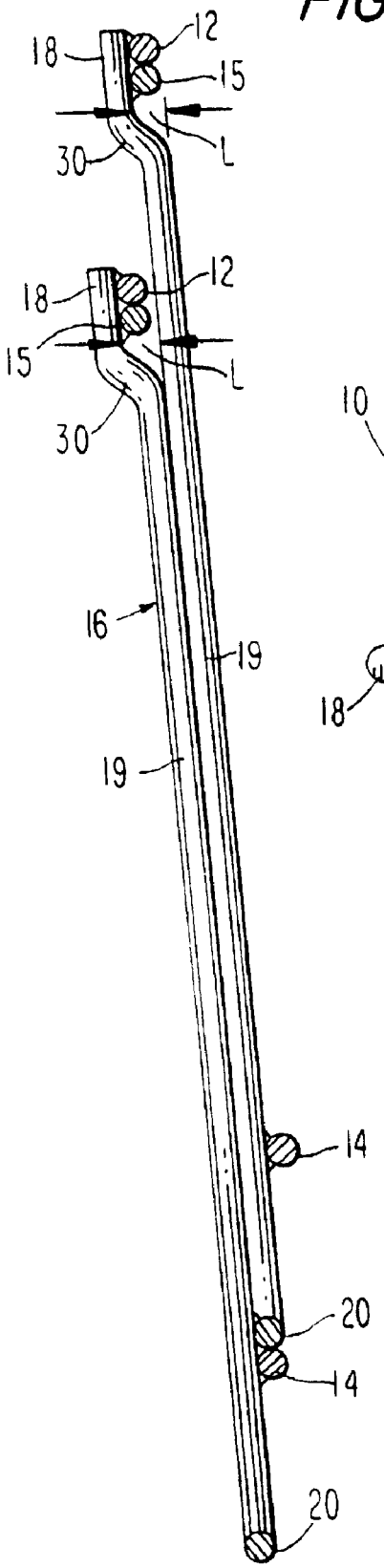
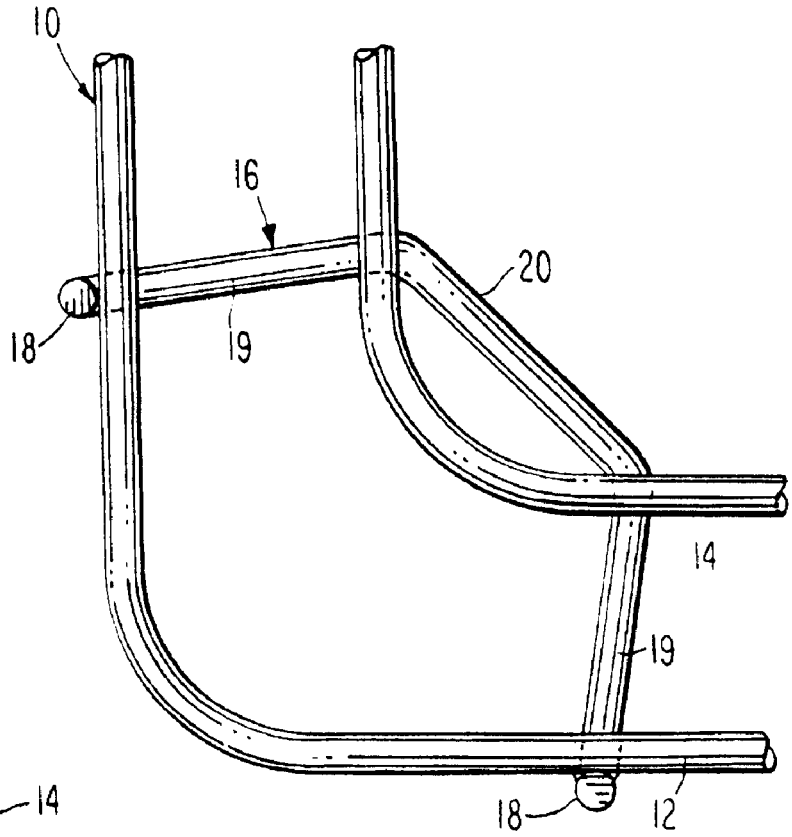
FIG. 6

WIRE CHAFING STAND

Matter enclosed in heavy brackets [ ] appears in the original patent but forms no part of this reissue specification; matter printed in italics indicates the additions made by reissue.

FIELD OF INVENTION

This application is a continuation-in-part of U.S. patent application Ser. No. 08/864,562 filed May 28, 1997 *now U.S. Pat. No. 5,921,513* and relates to a wire chafing stand which is nestable and stackable for compact storage and transportation.

BACKGROUND OF THE INVENTION

A chafer is a device for maintaining pre-cooked food at a remote location relative to the kitchen where the food is cooked. The chafer is supported upon a transportable wire stand hereinafter referred to as a "wire chafing stand" and is preferably composed of steel. The wire chafing stand of the present invention is a relatively simple structure having an upper rim and a lower rim interconnected to each other by means of wire legs. The wire legs are preferably welded to the upper and lower rims at the corners of the structure with the wire legs extending below the lower rim so that they also function as bottom supports to keep the stand level with the ground and to maintain the lower rim at a predetermined height above ground level for placement of chafing fuel heaters for the chafing dish in the stand.

Wire chafing stands are transported and stored nested together in multiple units. Presently, wire chafing stands permit the stands to be partially nested into one another when stacked i.e., the stands nest only to a limited extent. The cost of storage and transportation has a direct relationship to the vertical height of a stack of nested wire stands. Accordingly, for wire stands with only limited nesting capability the transportation cost for transporting such wire stands over long distances becomes a significant factor in its selling price. This, in turn, reduces the ability to compete over large geographical areas where transportation cost and/or storage cost become too large. Although many solutions have been proposed which permit deep nesting of multiple stands to reduce the vertical column height of a stack of nested stands such prior solutions were dependent upon complicated wire stand designs which otherwise increase the cost of fabrication and cause the stand to be unwieldy structurally as well as esthetically. An even further problem of significance relates to the ease of removal of the wire stands from one another after nesting. Generally if the wire stands are tightly nested they tend to wedge into one another and are then difficult to separate. Thus it is important that when nesting multiple wire stands that the wire stands do not wedge and are readily separable from one another.

BRIEF DESCRIPTION OF THE INVENTION

The wire chafing stand of the present invention permits multiple wire chafing stands to be nested and readily separated from one another without causing wedging. Moreover the wire chafing stand of the present invention when nested yields a substantial reduction in column height relative to the column height of an equivalent number of nested wire chafing stands of a conventional design. In addition, the wire chafing stand of the present invention is easy to fabricate and is of simple construction.

The wire chafing stand of the present invention comprises an upper rim of wire steel which forms a closed geometrical configuration circumscribing a first surface area, a lower rim of wire steel forming a closed geometrical configuration circumscribing a second surface area with said first surface area being larger than said second surface area and having a plurality of wire legs of equal length affixed at one end thereof to the upper rim and affixed to the lower rim at an equal location substantially approximate the opposite end of each wire leg such that the upper rim and lower rim lie in substantial parallel alignment to one another with the wire legs extending equal distances below the lower rim to uniformly support the stand at each opposing end thereof and with each wire leg having an indent (hereinafter "offset") located adjacent the upper end thereof which laterally displaces each leg relative to the point of attachment of said leg with the upper rim of the stand so that the wire legs of one wire stand can substantially nest within another wire stand without significant wedging.

In an alternative embodiment of the present invention the wire chafing stand comprises an upper rim of wire steel which forms a closed geometrical configuration circumscribing a first surface area, a lower rim of wire steel forming a closed geometrical configuration circumscribing a second surface area with said first surface area being larger than said second surface area and having a plurality of wire legs of equal length affixed at one end thereof to the upper rim and affixed to the lower rim at an equal location substantially approximate the opposite end of each wire leg such that the upper rim and lower rim lie in substantial parallel alignment to one another with the wire legs extending equal distances below the lower rim to uniformly support the stand at each opposing end thereof and with either said upper rim of said stand or said wire legs having an offset at the point of interconnection therebetween to facilitate nesting of multiple wire chafing stands.

In a further alternative embodiment of the present invention the wire chafing stand comprises an upper rim of wire steel which forms a closed geometrical configuration circumscribing a first surface area, a lower rim of wire steel forming a closed geometrical configuration circumscribing a second surface area with said first surface area being larger than said second surface area and having a plurality of wire legs of equal length affixed at one end thereof to the upper rim and affixed to the lower rim at an equal location substantially approximate the opposite end of each wire leg such that the upper rim and lower rim lie in substantial parallel alignment to one another with the wire legs extending equal distances below the lower rim to uniformly support the stand at each opposing end thereof and with each of said wire legs being a unitary continuous having an extended portion defining a handle for the wire chafing stand.

BRIEF DESCRIPTION OF THE DRAWINGS

Other advantages of the present invention will become apparent from the following detailed description of the invention when read in conjunction with the accompanying drawings of which:

FIG. 5 is a partial view in cross section of the embodiment of the wire leg arrangement of FIG. 4 taken along the lines 5-5 of FIG. 4;

FIG. 6 is a is a partial elevational view taken along the lines 6-6 of FIG. 4;

DETAILED DESCRIPTION OF THE INVENTION

Figure 1:
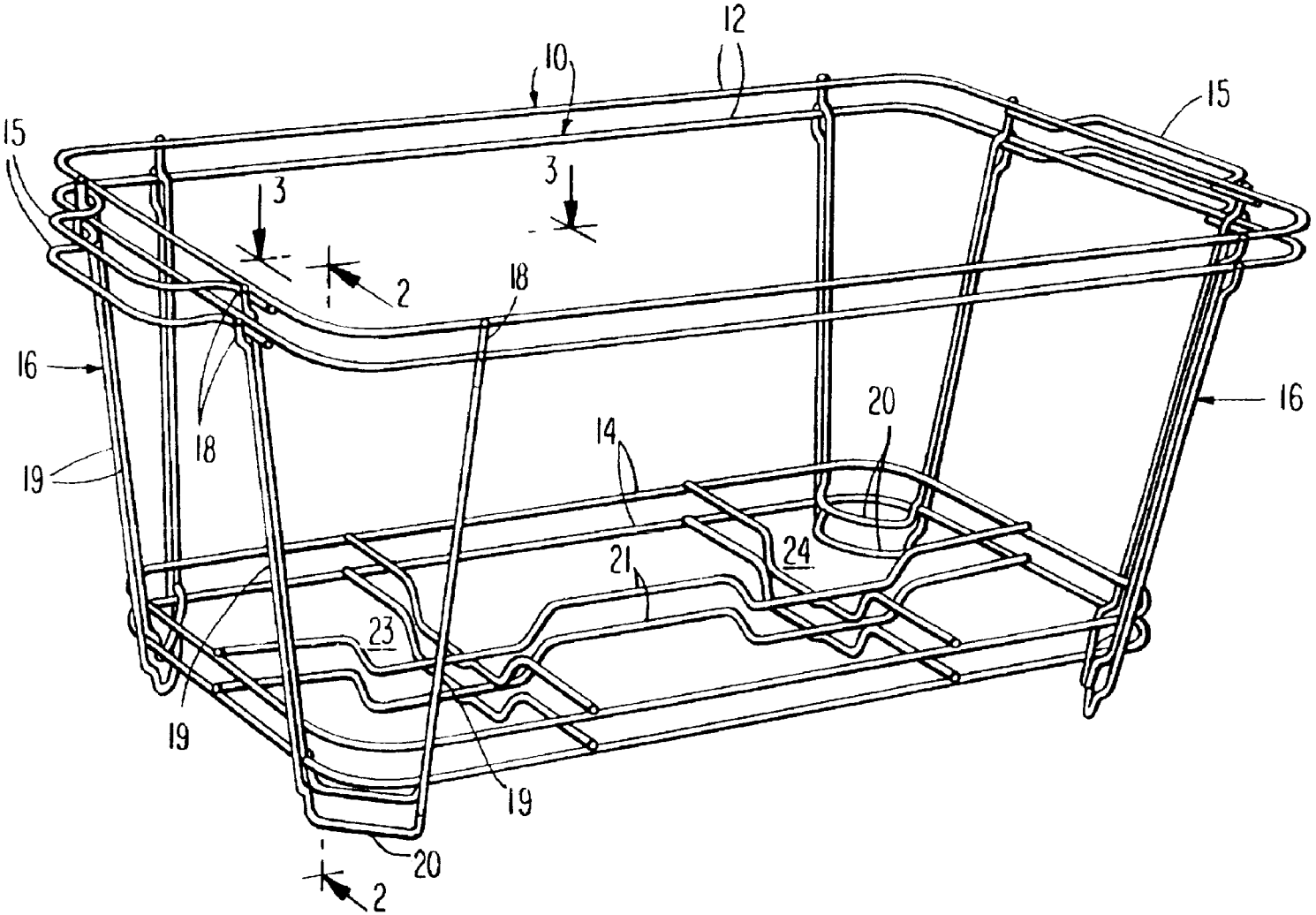
FIG. 1 is an isometric view of a pair of nested wire chafing stands in accordance with the present invention showing one embodiment of a wire leg arrangement.

Referring now in detail to FIG. 1-6 of the drawings which illustrate a pair of nested wire chafing stands 10 of identical construction with each stand 10 including an upper rim 12 of any desired geometry, such as oval, square or rectangular, and a lower rim 14 of a geometry substantially identical to that of the tipper rim 12. The upper rim 12 circumscribes a larger surface area than the surface area circumscribed by the lower rim 14. The upper rim 12 is spaced apart from the lower rim 14 by wire legs 16 so that the upper and lower rims are in a substantially parallel relationship. The wire legs 16 also serve to provide leg supports for the stand 10 at each opposite corner of the stand 10 so that the stand 10 is uniformly supported from each corner with the lower rim 14 at a predermined height above the level support such as a table upon which the wire legs 16 are placed. The wire legs 16 are preferably constructed of steel wire rod and may be of the same composition and diameter as that of the upper and lower rims 12 and 14 respectively. Each stand 10 may also include wire rod handles 15 at opposite ends of the wire stand formed by welding the wire rod handles 15 to the upper rim 12.

Four wire legs 16 are welded at their upper ends 18 to the upper rim 12 at each of the four corners of the stand 10 and are welded to the lower rim 14 so that each wire leg 16 extends below the lower rim 14 by a substantially equal distance such that the lower rim 14 is maintained at a fixed height above the support level upon which the stand 10 rests. The stand 10 supports a chafing dish (not shown) which is suspended from the upper rim 14 above the lower rim 12. A plurality of additional wire rods 21 are affixed to the lower rim 14 and intersect each other at right angles forming a wire grid network which supports a plurality of chafing fuel heaters (not shown) for keeping the chafing dish warm. The wire rods 21 may be bent for forming symmetrical undulations along the length of each wire rod 21 which intersect to provide recessed spaces 23 and 24 for placement of the chafing fuel heaters. The bending of the wire rods 21 to form recessed areas 23 and 24 is a conventional arrangement.

Each wire leg 16 is preferably bent from a single straight wire rod into a somewhat "U" shaped configuration having two sides 19 and a base 20 with the sides 19 extending outwardly from the base 20 of the leg 16. The upper end 18 of each of the sides 19 is welded to the upper rim 12. The lower rim 14 is then welded to each side 19 of the wire leg 16 at a fixed distance above the base 20. The base 20 of each wire leg 16 should lie in a horizontal plane substantially level with the ground. The sides 19 may extend from the base 20 at right angles or may be slanted as shown in the figures forming an included oblique angle with the base 20 of up to 130°. The interconnected corners connecting the sides 19 and the base 20 may be left somewhat rounded as a result of the bending operation.

To readily facilitate nesting between wire stands 10 each side 19 of each wire leg 16 includes at least one offset 30 located near the upper end 18 of the wire leg 16 which displaces the side 19 of the wire leg 16 laterally. The offset 30 may be formed by a bending or crimping operation or by stamping the leg in a press at a location adjacent the upper ends of each of the wire legs 16. The offset 30 indents the wire leg 16 so as to cause a lateral displacement of each side 19 of each wire leg 16 in a substantially horizontal direction from a predetermined location below the upper rim 12. This enables the wire legs 16 of a single wire chafing stand 10 to readily nest within another wire chafing stand 10 without interference and minimizes one wire stand 10 from wedging within another. The length "L" of the offset 30 is a control varible as is the distance of the offset 30 from the upper rim 12. The offset 30 forms an oblique angle resulting in the length "L" being proportional to the horizontal displacement caused by the offset 30.

Figure 2:
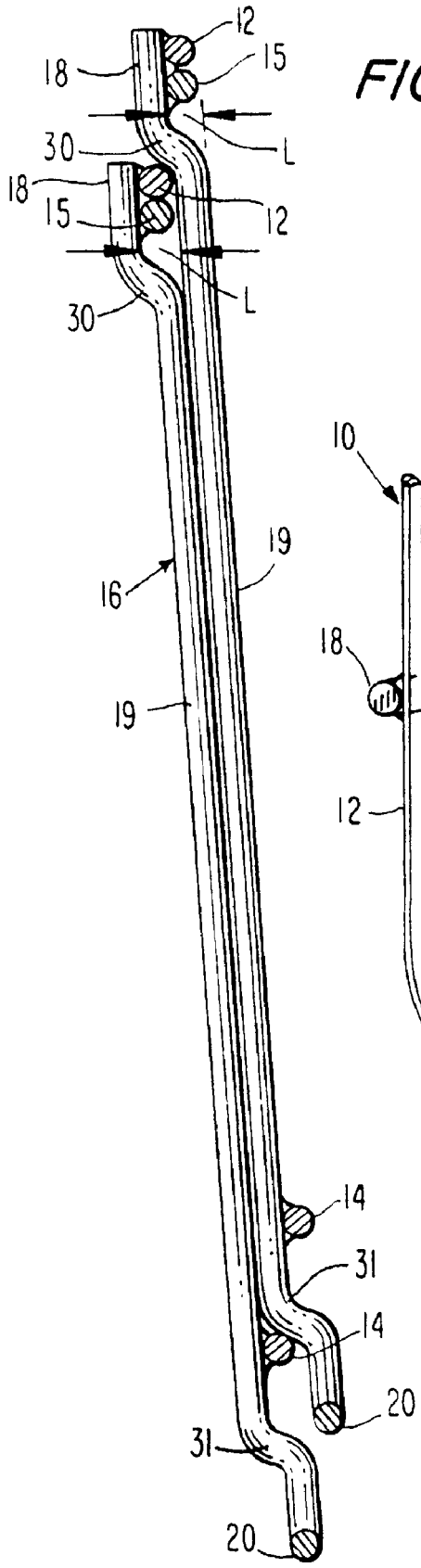
FIG. 2 is a partial view in cross section of the wire leg arrangement in the wire chafing stand of the present invention taken along the lines 2-2 of FIG. 1.
Figure 3:
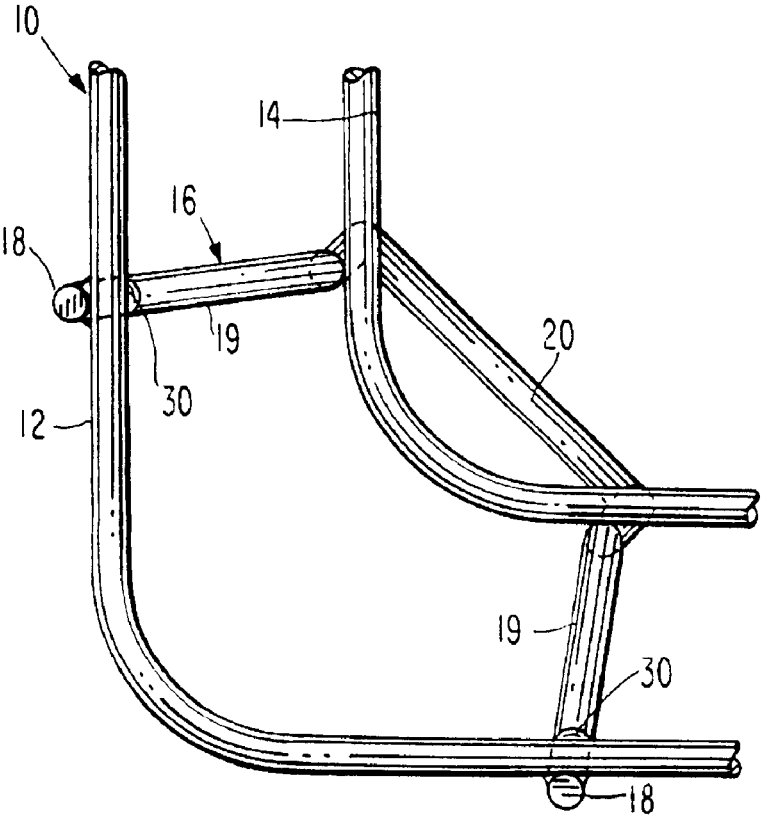
FIG. 3 is a partial elevational view taken along the lines 3-3 of FIG. 1.

The first embodiment of the present invention as shown in FIGS. 1-3 uses two offsets 30 and 31 located at opposite ends of each side 19 of a wire leg 16. The upper offset 30 is located adjacent the tipper rim 12 whereas the lower offset 31 is located adjacent the lower rim 14. The upper and lower offsets 30 and 31 are formed in an identical manner. The position of the lower offset 31 should preferably be located above the lower rim 14 of the basket that it nests into. In this way the lower offset 31 can provide an effective stop against further insertion of a wire stand 10 into another wire stand 10.

Figure 4:
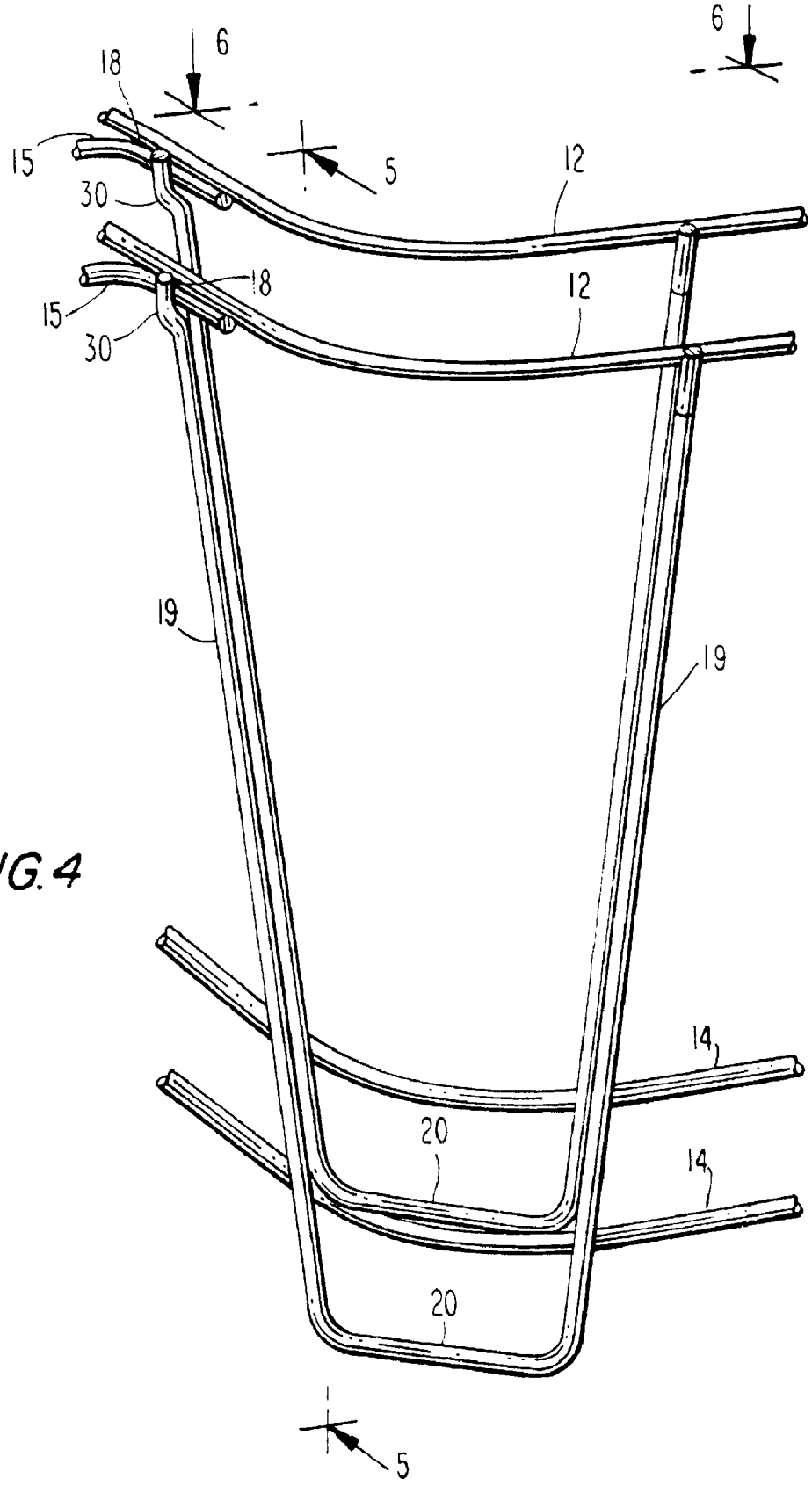
FIG. 4 is an enlarged fragmentary view showing another embodiment of a wire leg arrangement for the pair of nested wire chafing stands of the present invention.

The second embodiment of the present invention is shown in FIGS. 3-6 and uses only an upper offset 30 in each side wall 19 of each wire leg 16. In this embodiment as shown in FIG. 4 the lower rim 14 acts as a stop for the wire legs 16 of the upper stand 10 to prevent further nesting of the two wire stands and to facilitate their separation. Alternatively, since the horizontal offset distance is proportional to the offset length "L", if the offset 30 is long enough it will determine the point of contact, if any, between the wire legs 16 in one wire stand 10 and the lower rim 14 of a second stand 10 in which the first is nested.

Figure 7:
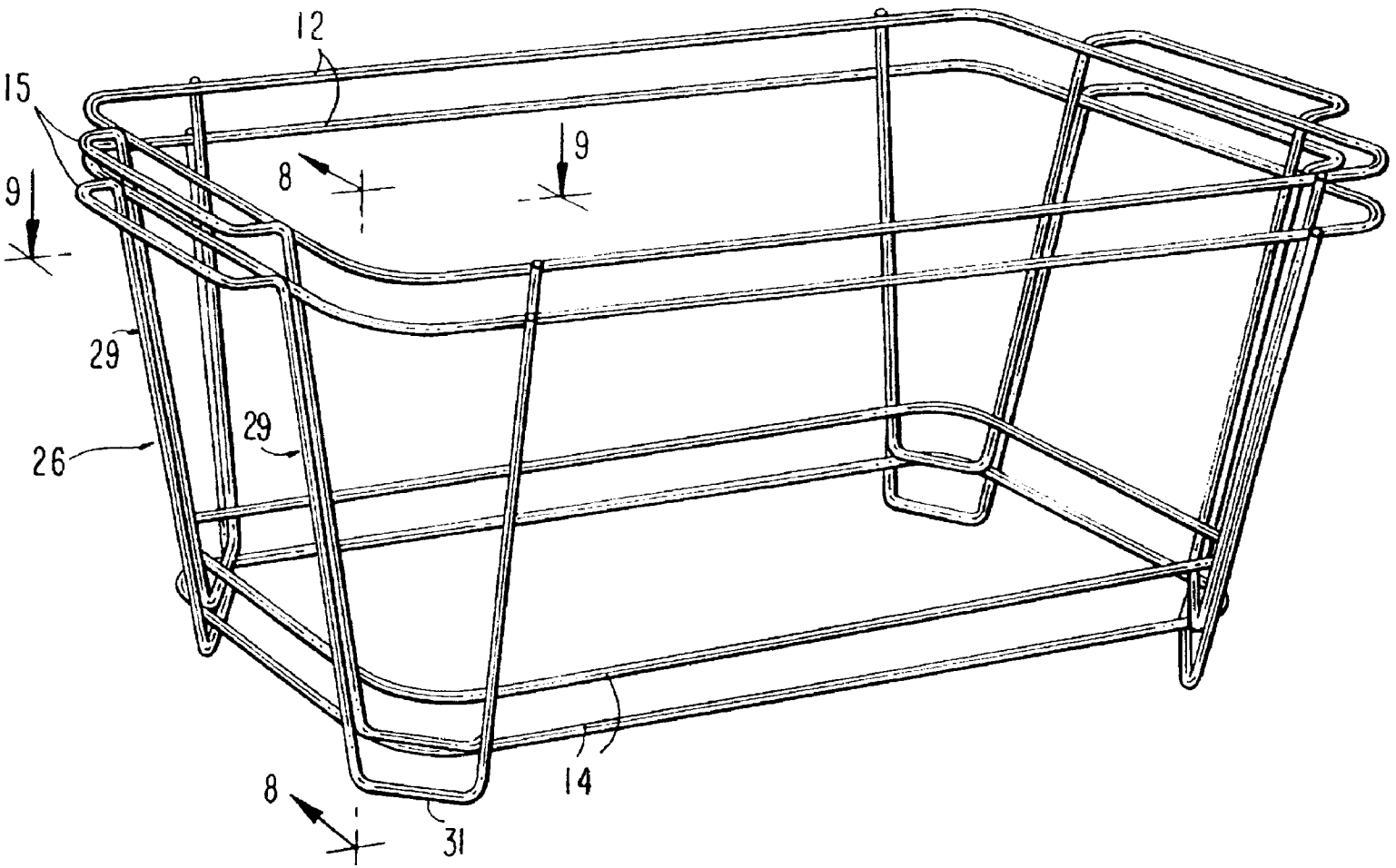
FIG. 7 is a perspective view of an alternative embodiment of the present invention.
Figure 8:
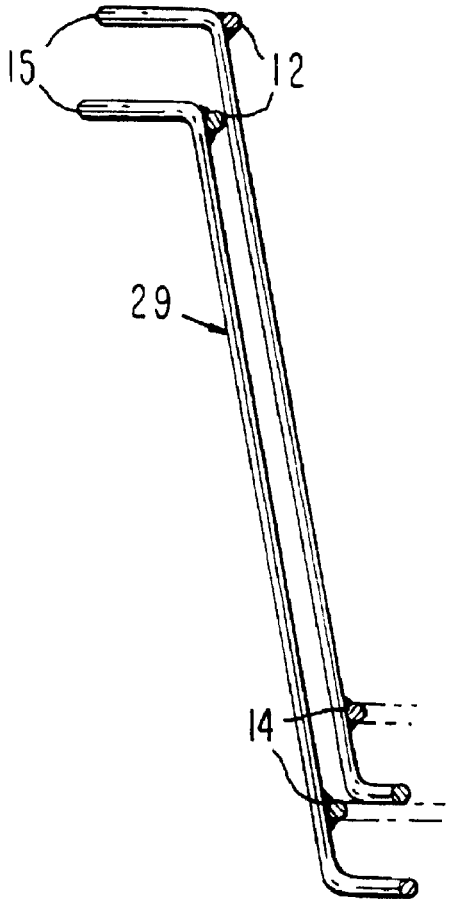
FIG. 8 is a cross sectional view taken along the lines 8-8 of FIG. 7.
Figure 9:
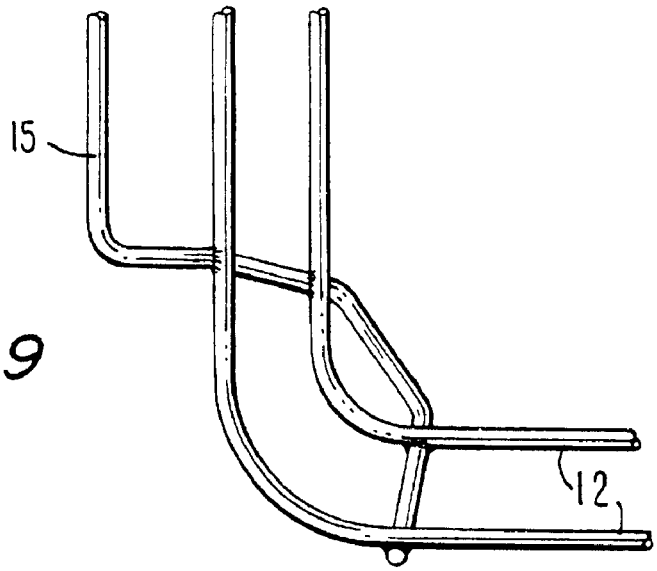
FIG. 9 is a plan view taken along the lines 9-9 of FIG. 7.

FIGS. 7, 8 and 9 show another embodiment of the present invention having only two wire legs 26 for supporting the chafing stand 10 from its opposite ends along its longitudinal axis. Each wire leg 26 is formed from a single wire rod by a series of bending operations. Each wire leg 26 includes two somewhat "U" shaped sections 29 connected through an intermediate section 15 extending therebetween. The intermediate section 15 forms a handle for holding the chafing stand 10 from its opposite ends. Each of the "U" shaped sections 29 has a configuration substantially identical to that of one of the wire legs 16 in the first two embodiments of FIGS. 1-6 and extends outwardly below the lower rim 14 of the chafing stand 10 to form a base support 31 for the stand. The upper and lower rims 12 and 14 are welded to the sections 29 of the wire legs 26 end 18 as shown in FIG. 8. The base 31 of each section 29 should lie in a horizontal plane substantially level with the ground. The wire legs 26 may be assembled using a conventional fixture bending jig and stamping machine or using an appropriate programmed computer numeric controlled "CNC" bending machine or dedicated forming machine. The advantages of this assembly is a simplified design which incorporates the handle 15 in the formation of each of the wire legs 26 thereby reducing the number of components in the assembly of the stand 10. It also eliminates unnecessary handling and simplifies the welding operation. The offsets 30 and 31 of FIGS. 1-6 may, if desired, also be included in each of the sections 29 of the wire legs 26 to enhance the nesting capability of each stand 10.

Figure 10:
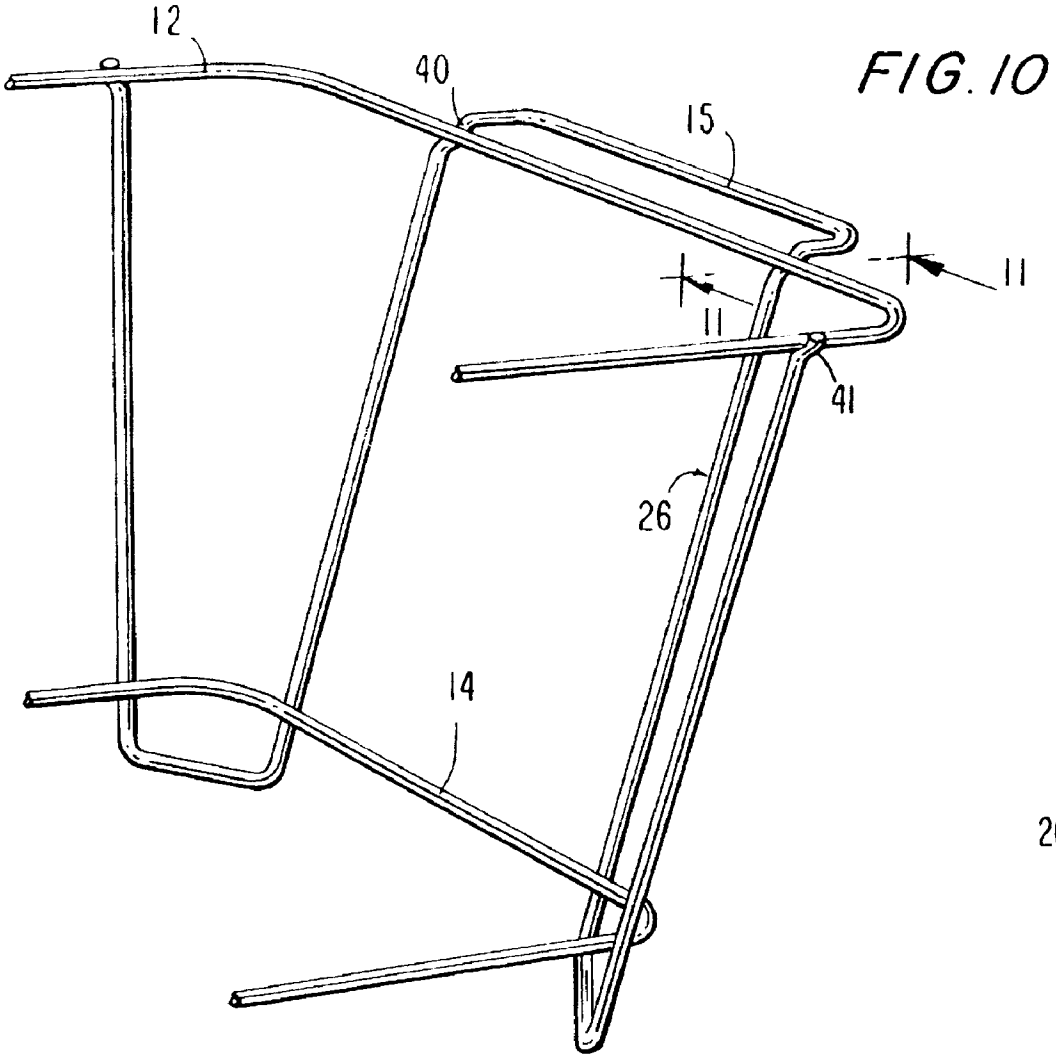
FIG. 10 is a partial perspective view of yet another alternative embodiment of the present invention.
Figure 11:
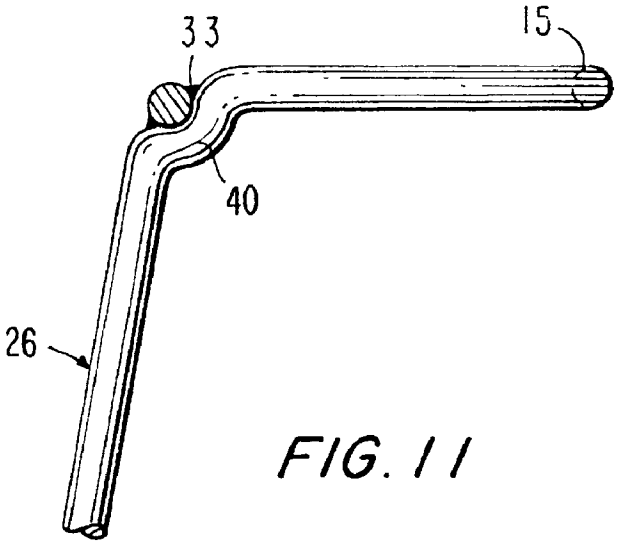
FIG. 11 is cross sectional view taken along the lines 11-11 of FIG. 10.
Figures 12, 13:
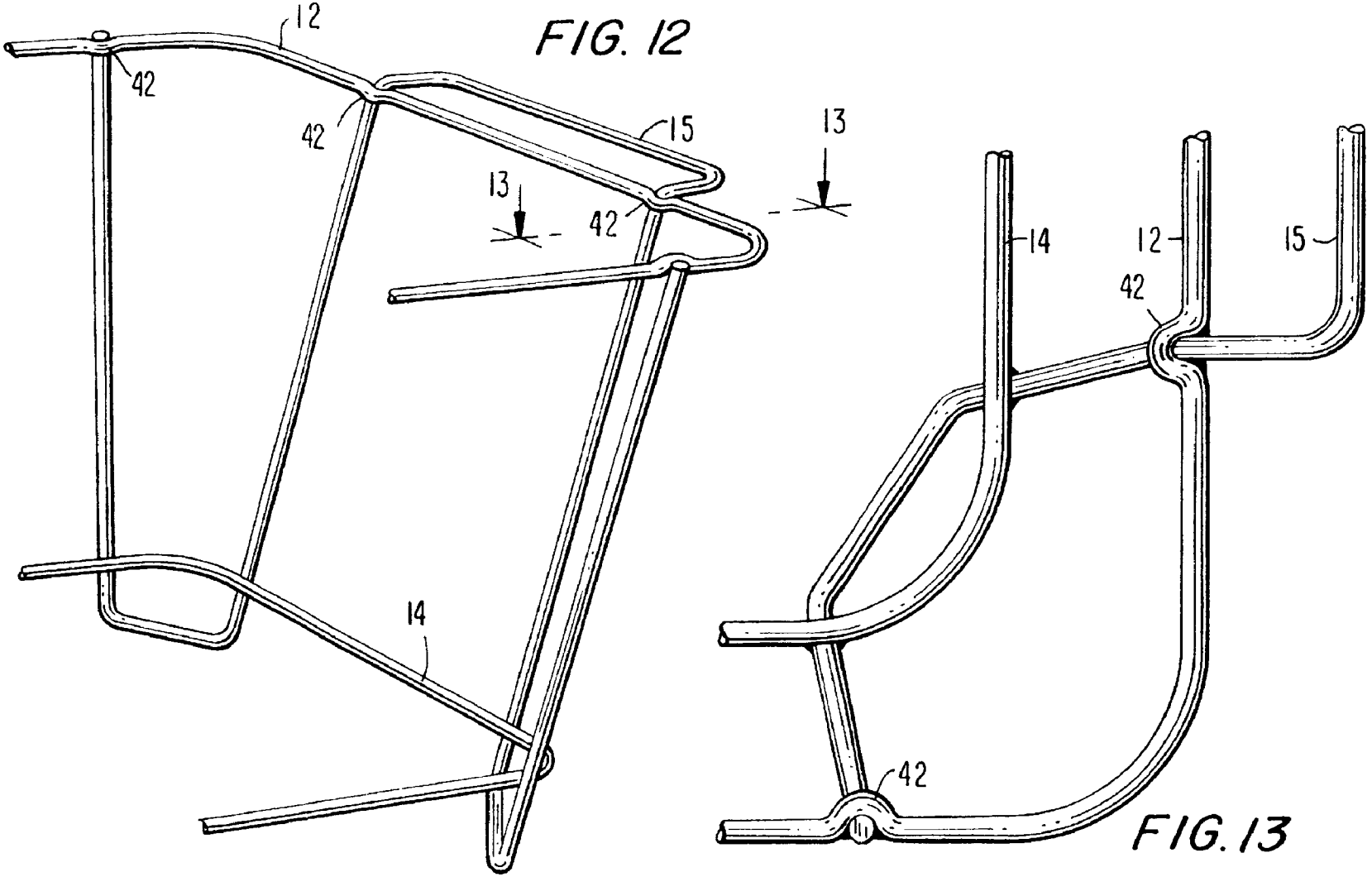
FIG. 12 is still another alternative embodiment of the present invention and FIG. 13 is a top plan view taken along the lines 13-13 of FIG. 12.

Another embodiment is shown in FIGS. 10-11 in which the wire legs 26 contain offsets 40 and 41 located at the point of interconnection of the wire leg 26 and the upper rim 12 of the stand 10. The offsets 40 and 41 support the upper rim 12 to enhance the weld 33 between the upper rim 12 and the wire legs 26 as shown in FIG. 11 forming a structurally sound frame for the stand 10. The offsets 40 and 41 also facilitate the nesting of multiple wire chafing stands. A variation of this embodiment is shown in FIGS. 12-13 in which offsets 42 are formed in the upper rim 14 of the chafing stand 10.

What I claim is:

1. A wire chafing stand comprising [an upper] *a first* rim of wire steel which forms a closed geometrical configuration circumscribing a first surface area, [a lower rim of wire steel forming a closed geometrical configuration circumscribing a second surface area with said first surface area being larger than said second surface area] and having [a plurality of] *at least two* wire legs with each wire leg having two upright sections interconnected to one another [at a location below the lower rim] in a configuration forming a base support for the stand to rest upon with each upright section extending upwardly from said base support to form an angle equal to or greater than 90° with respect to a horizontal plane through said base support and being affixed to the [upper] *first* rim adjacent one end thereof [and to said lower rim at a relatively equal distance below the point of attachment to said upper rim] and further comprising a plurality of offsets located either in said upright sections of said wire legs or in said [upper] *first* rim for laterally displacing each wire leg relative to said [upper] *first* rim to facilitate the nesting of a multiplicity of stands into one another without significant wedging.

2. A wire chafing stand as defined in claim 1 wherein said plurality of offsets are in said upright sections and divide each upright section into two segments lying in different planes relative to one another.

3. A wire chafing stand as defined in claim [2] *7* wherein said [upper and lower rims] *first and second rim* form a geometry selected from the class consisting of square, oval and rectangular configurations.

4. A wire chafing stand as defined in claim 3 wherein said wire legs support said stand from opposite sides thereof with each wire leg having a unitary construction and having two generally "U" shaped sections extending between an intermediate section defing a handle for the stand.

5. A wire chafing stand as defined in claim 1 wherein said plurality of offsets are welded to said wire legs at the separation of the upright sections into segments.

6. A wire chafing stand comprising an upper rim of wire steel which forms a closed geometrical configuration circumscribing a first surface area, a lower rim of wire steel forming a closed geometrical configuration circumscribing a second surface area with said first surface area being larger than said second surface area and having two wire legs for supporting said stand at opposite ends thereof with each wire leg being of unitary construction having two upright sections of substantially equal length with the upright sections being interconnected to one another in a generally "U" shaped configuration below said lower rim to form a base support for the stand to rest upon and being interconnected to one another adjacent the upper rim for defining a handle for the wire chafing stand and being welded at predetermined locations to the upper and lower rims such that the upper and lower rims lie in substantial parallel alignment to one another and with each upright section extending upwardly from the base support to form an angle equal to or greater than 90° with respect to a horizontal plane through said base support and further comprising a plurality of offsets located in said upright sections of said wire legs which separate the upright sections into segments lying in different planes relative to one another for laterally displacing each wire leg relative to said upper rim so as to facilitate the nesting of a multiplicity of stands into one another without significant wedging.

*7. A wire chafing stand as defined in claim 1 further comprising a second rim of wire steel located below said first rim with said second rim circumscribing a second surface area smaller than said first surface area and with said upright sections being affixed to said second rim at a relatively equal distance below their attachment to the first rim.*

* * * * *